3,302,755
HYDRAULIC-DECELERATOR SYSTEM
John R. Botterill, Frankfurt am Main-Eschersheim, Fritz Ostwald, Buchschlag, Hesse, Carl Press, Offenbach, Main, and Wilhelm Knapp, Bad Homburg vor der Hohe, Germany, assignors to Alfred Teves, Maschinen- und Armaturenfabrik K.G., Frankfurt am Main, Germany, a corporation of Germany
Filed Feb. 16, 1965, Ser. No. 433,032
Claims priority, application Germany, Feb. 22, 1964, T 25,672; Mar. 3, 1964, T 25,739
17 Claims. (Cl. 188—86)

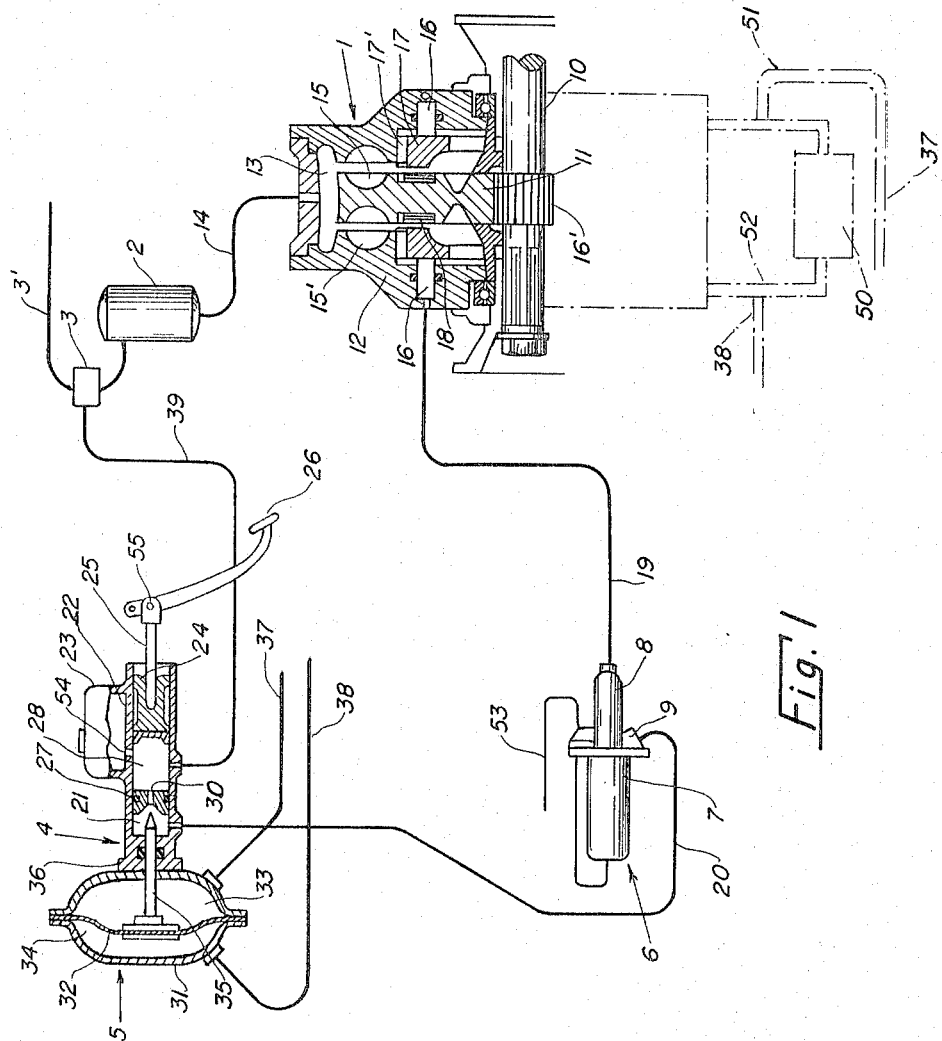

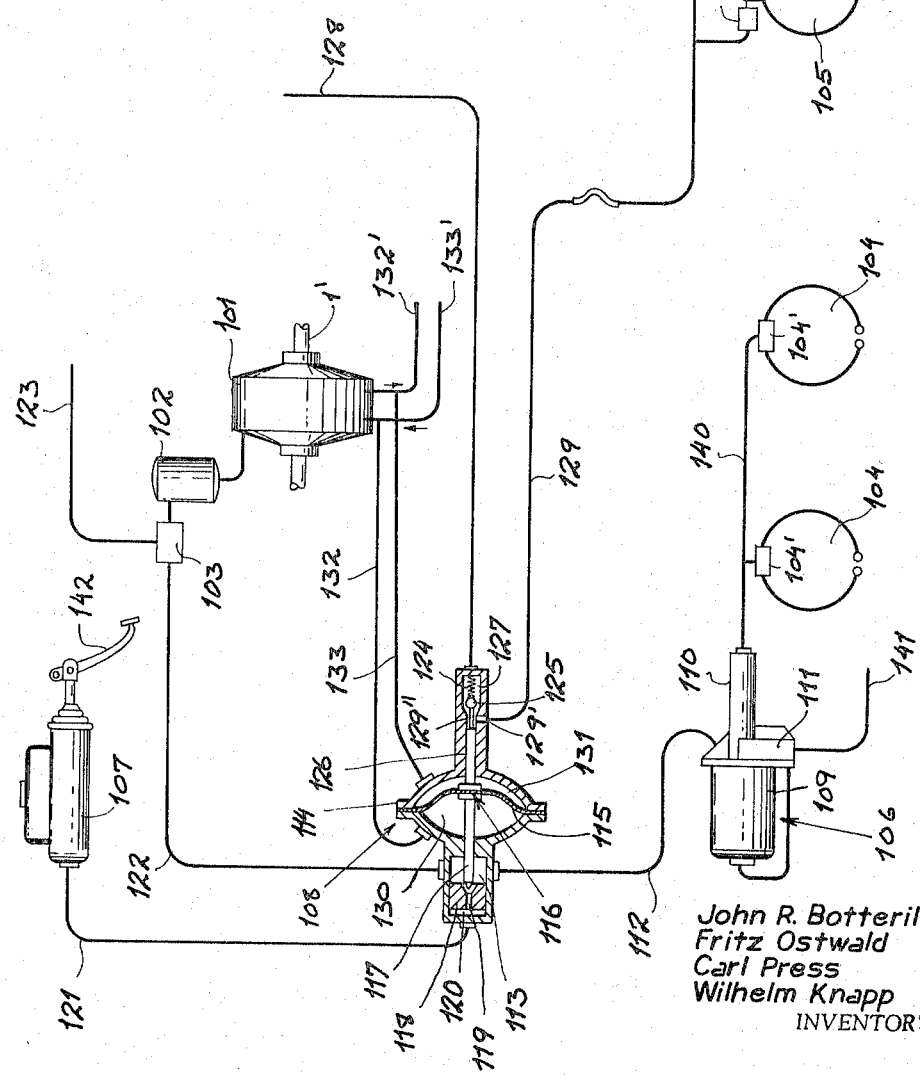

The present invention relates to a hydraulic-decelerator system for automotive vehicles and, more particularly, to a braking system for such vehicles which includes a hydraulic decelerator and is adapted to bring the vehicle to standstill.

In the commonly assigned co-pending application, Ser. No. 402,970, filed October 9, 1964 (now U.S. Patent No. 3,265,162, issued August 9, 1966) by J. R. Botterill, one of the present applicants, a brake-system for an automotive vehicle is described wherein a hydraulic decelerator operates in conjunction with the usual wheel-brakes of the vehicle to bring it to standstill and yet utilizes the optimum braking effectiveness of both the wheel brakes and the decelerator.

While hydraulic decelerators have been employed prior to the present development, for the most part they have been used merely as an accessory in the braking of the vehicle and were not an integrated part of the braking system. It was, for example, the practice to provide an actuating lever on the instrument panel of the vehicle to cut in or out the decelerator, as required. The decelerator, which generally included a rotor mounted upon the shaft of the vehicle, carried out a pumping action especially at high vehicle speed, when fluid under pressure was supplied. Thus, the decelerator functions similarly to a fluid coupling or torque converter, the difference being that the stator and/or second rotor of such a coupling is connected to the chassis. The heat evolved in the pumping and braking action is dissipated through a heat exchanger, the decelerator pumping the hydraulic fluid on a substantially closed path therethrough.

In conventional automotive brakes a set of wheel-brake cylinders is provided and is responsive to actuation by fluid under pressure from a main or master-cylinder or some other fluid-controlled brake-actuating means (e.g. an air-brake valve). The wheel-brake cylinders control the brake shoes associated with each wheel of the vehicle and may co-operate with them in the manner of the conventional disk or internally expanding drum-type brakes. And, as pointed out in the co-pending application mentioned above, a hydraulic decelerator in which the only coupling between the stator and the rotor is the fluid, cannot bring the vehicle to standstill alone. In fact, the lower the speed of the rotor with respect to the stator, the less efficient is the pumping action and the braking effectiveness of the vehicle. As the speed reduces to zero or negligible value, the braking effectiveness drops off to zero. For the purpose of the present disclosure, when reference is made to the hydraulic decelerator, it is intended to include all conventional types of decelerator now employed for the purpose indicated, although it is preferred if the decelerator is of the known type comprising a rotor with an annular cross-section co-operating with an array of radial vanes. Such decelerators have the configuration of fluid couplings except that the two rotors of such a coupling may be joined together for rotation with respect to the stator, or one of the rotors may be connected to the power shaft while the other is fixed to the chassis. The housing portion laterally of the rotor and surrounding the latter can be provided with another array of radial vanes. The stator can be provided with annular ducts or chambers from which the pumped hydraulic fluid is led off under pressure during high-speed rotation of the rotor. Moreover, trailer-type vehicles linked with the powered vehicle could not have their brake systems integrated with the hydraulic decelerator and were not provided, in general, with a powered shaft upon which a hydraulic decelerator could be mounted.

In the above-mentioned co-pending application an integrated braking system is described, wherein the net braking effectiveness of the wheel or the friction brake and the hydraulic decelerator is constant regardless of the speed of the vehicle, assuming a constant application of force to the braking lever. In this system, a master cylinder or other fluid-responsive brake-actuating means is coupled with the wheel brakes for energizing the latter and interconnected with the decelerator by suitable control means for concurrently operating same. The control means is connected with the decelerator in a feed-back arrangement whereby the braking effectiveness of the decelerator effects an adjustment of the control means to vary the braking effectiveness of the wheel brakes in inverse relationship to that of the decelerator. The control means for accomplishing this includes a fluid-operated valve, adapted to energize the decelerator directly or via pressure-storage devices, floating-piston arrangements or the like, a differential valve being interposed between the brake-actuating means and the decelerator and wheel brakes. Advantageously, the differential valve is provided with a passage communicating between the brake-actuating device and decelerator wheel-brake arrangements, this passage being selectively blocked and unblocked by a valve body whose position relative to the seat-forming member, provided with the passage, is controlled in response to the degree of braking of the vehicle shaft by the hydraulic decelerator. The valve body can, for example, be directly coupled with the stator which may be resiliently mounted for limited freedom of angular displacement whereby the torque applied to the housing or stator as a consequence of the pumping action of the decelerator is exploited to adjust the valve body in accordance with the braking effectiveness. Alternatively, the valve body can be shiftable by a pressure-responsive element, such as a differential membrane or piston, in response to the pressure differential developed between the inlet and outlet sides of the closed hydraulic system of the decelerator. Through the use of this differential-valve arrangement, an integrated braking system has been obtained which utilized the hydraulic decelerator and wheel-brake means. The significance of this arrangement will be more apparent when it is understood that the hydraulic decelerator is most efficient at elevated shaft speeds (high r.p.m.), while the frictional wheel brakes are least effective in this circumstance. At low shaft speeds, the braking effect of the decelerator is reduced to a negligible value while the braking efficiency of friction brakes is at a maximum at such low speed. The system of this application thus permits the hydraulic decelerator to take over the major part of the braking action at high speeds and even relieve the wheel brakes. The latter are, nevertheless, required to bring the vehicle to a complete stop for the reasons mentioned above.

It is the main object of the present invention to provide a brake system for an automotive vehicle which constitutes an improvement and extends the principles of the aforementioned commonly owned application to arrangements in which the wheel brakes are not required to bring the vehicle to standstill.

Still another object of this invention is to provide a hydraulic decelerator system for automotive vehicles which is capable of completely halting them when brought into play.

It is a further object of the present invention to extend the principles set forth in the above-identified co-pending application to heavy trailer-type conveyances.

Another object of this invention is to provide a trailer-type conveyance, including a towing vehicle and a towed vehicle, wherein the brake arrangement of the latter is integrated with that of the former.

These objects and others which will become apparent hereinafter are attained, in accordance with the present invention, through the provision of a system generally similar to that set forth in the above-mentioned co-pending application, Ser. No. 402,970, wherein, however, the frictional wheel brakes of the vehicle can, if desired, be dispensed with. It has been found, in accordance with this aspect of the invention that a hydraulic-decelerator system for the braking of automotive vehicles can comprise a hydraulic decelerator whose rotor is coupled with the power shaft of the vehicle and whose stator is mounted upon the chassis, with or without limited freedom of angular movement about the shaft axis, the hydraulic decelerator being provided with fluid-responsive friction-brake means, engageable with the rotor for braking the latter with respect to the stator independently of or in assistance to the hydraulic braking force developed by the device. Thus, a system of this nature can operate in conjunction with conventional wheel-brakes and even wheel brakes whose operation is controlled as set forth in the aforementioned co-pending application, to ensure that the braking effectiveness remains constant at any given pressure applied to the brake pedal, regardless of whether the hydraulic decelerator, rotor brake or wheel brakes apply the greatest braking force. While the system of the present invention advantageously has its rotor brakes entirely replace the wheel brakes of the system of the aforesaid application, it may be observed that any of the brake-operating devices of said application can be used equally well to control the rotor brake (Principles of Automotive Vehicles, Dept. of the Army Technical Manual TM 9–8000, pages 449 ff., U.S. Government Printing Office, Washington D.C., 1956). The output of an air-hydraulic braking-force intensifier can be communicated to the fluid-responsive rotor brake for operating same. The intensifier can, as set forth in the co-pending application, be operated by a differential-valve system wherein a shiftable seat-forming member is provided with a high-pressure compartment in which fluid is pressurized by the plunger of a master brake-cylinder and, a low-pressure compartment communicating with the intensifier or with the rotor brake directly.

In accordance with the principles of the invention, the differential-valve assembly comprises a valve body which cooperates with the passage in the seat-forming member for selectively blocking and unblocking the flow of fluid to the rotor brakes, the valve body being adjustable in accordance with the degree of braking accomplished by the hydraulic decelerator via the feedback arrangement. The valve body may thus be mounted upon a diaphragm or membrane whose opposite sides are exposed to the fluid pressure at the inlet and outlet sides of the closed hydraulic path along which fluid is circulated by the hydraulic decelerator. In this system, the means for operating the hydraulic decelerator includes a fluid-operated valve by means of which the decelerator is charged with hydraulic fluid under pressure, the valve being actuated upon displacement of the brake plunger. While the fluid-operated decelerator-actuating valve can communicate with the low-pressure chamber of the differential valve-arrangement in a system in accordance with the present invention, it is preferred to connect the fluid-operated valve with the high-pressure chamber.

According to another aspect of the present invention, the rotor is constituted as a disk having one or more braking surfaces lying generally in a plane perpendicular to the axis of the shaft upon which the rotor is mounted. The rotor brakes are thus disk brakes shiftable in a direction parallel to the axis and transverse to the braking surfaces.

According to yet another feature of the invention, the master cylinder and the differential-valve assembly are provided in a single housing with, for example, the seat-forming member subdividing the main pressure chamber of the master cylinder into high- and low-pressure chambers of the differential valve, respectively. The high-pressure chamber thus can receive the plunger of the master cylinder directly while the valve may be mounted upon the master cylinder for axial displacement relative to the seat-forming member. Since both the differential valve and the master cylinder are united in a single housing, the conduits which would have been required to connect the master cylinder with the high-pressure chamber of the differential valve can be dispensed with. In any event, it is desired in accordance with the present invention that the additional valve assembly function in order to maintain, for a constant force applied to the brake pedal, a braking effectiveness of the hydraulic decelerator which is roughly inversely proportional to the friction braking of the rotor thereof so that the braking force applied in stopping the vehicle is substantially constant.

In accordance with a further aspect of the instant invention, a braking system for the trailer-type conveyance whose powered vehicle (e.g. a road or highway tractor) has a drive shaft coupled with its wheels and whose trailer is provided with fluid-responsive wheel-brake means for operation upon the supply of fluid under pressure thereto; a hydraulic decelerator is operatively connected to the shaft of the powered or towing vehicle and is of the type described above.

The braking system also comprising brake-operating means on the powered vehicle for energizing with fluid the hydraulic decelerator while control means, responsive to the degree of braking by the decelerator of the shaft, selectively displaces a valve body co-operating with a fluid passage of the brake-operating means to provide a feedback from the decelerator to the latter, thereby reducing the effectiveness of an additional brake means (e.g., the rotor brake) adapted to bring the powered vehicle to a standstill when the hydraulic decelerator is at its highest effectiveness. In short, therefore, the system operates, upon actuation of the master cylinder, to insure that the collective braking effects of the hydraulic decelerator and the additional brake means of the powered vehicle are substantially constant, as described in the above-identified copending application.

An important feature of the invention thus resides primarily in the provision of further valve means operable by the control means, which is responsive to the degree of braking of the shaft by the decelerator, for supplying fluid under pressure to the wheel brakes of the trailer-type vehicle so as to render them effective upon a decline in the degree of braking of the shaft by the decelerator. While the additional brake means referred to above may be disk-type brakes built directly into the hydraulic decelerator, it is preferred that, in trailer-type conveyances, the additional brake means be constituted by wheel brakes or the powered vehicle energizable by a fluid network independent of that supplying the wheel-brake means of the trailer. The further valve means of the instant invention thus can include an additional valve body mechanically connected to the first valve body for displacement concurrently therewith to block and unblock an opening by means of which fluid under pressure can be communicated to the wheel brakes of the trailer. The differential valve means co-operates with the further valve for controlling the flow of fluid to the trailer brakes by a valve body having a double function, namely that of controlling the application of the wheel brakes and decelerator brake of the powered vehicle so that their total braking effects remains constant, and energizing the wheel brakes of the trailer. The additional valve may be supplied with fluid under pressure from any convenient source (e.g., with compressed air or hydraulic fluid) and is provided with a valve seat surrounding an opening communicating with the trailer brakes and co-operating with one stem of the valve body. The other stem thereof co-operates with the seat-forming member of the differential piston means. The valve bodies are shiftable in response to the degree of braking of the shaft by the decelerator and can be mechanically coupled therewith although it is preferred that the hydraulic pressure differential developed by the decelerator during braking be employed to apply a pressure differential to the valve bodies. For this purpose, the control means can include an element (preferably a membrane although a resiliently mounted piston will also serve), to the opposite sides of which are connected the high- and low-pressure sides of the hydraulic decelerator. The valve bodies or stems are rigidly fixed to the element and advantageously extend therefrom in opposite directions.

The above and other objects, features and advantages of the present invention will become more readily apparent from the following description, reference made to the accompanying drawing in which:

FIG. 1 is a flow-diagram, illustrating a brake system in accordance with the present invention with the hydraulic vehicle and the differential-valve/master-cylinder assembly shown in axial cross-section;

FIG. 2 is a view of a modified hydraulic decelerator according to the present invention; and FIG. 3 is a diagram, partly in section, of a brake system for a trailer-type conveyance.

In FIG. 1 of the drawing there is shown a hydraulic decelerator, which may be of the general type disclosed in the aforementioned application, but preferably has the configuration shown in FIGS. 1 and 2 of the present case. The hydraulic decelerator 1 comprises a disk-shaped rotor 11, keyed to the shaft 10 of the automotive vehicle via splines 10' within a housing 12 forming the stator and connected with the vehicle chassis in a conventional manner. The rotor 11 defines with the housing 12 an annular compartment 13 into which hydraulic fluid is fed via a line 14 from a charging cylinder 2 in a manner to be described in greater detail hereinafter. The vanes or blades 15, 15' of the rotor and stator effect a pumping action and displace the hydraulic fluid through a heat exchanger 50. The heat exchanger 50 is connected in a closed fluid path with the hydraulic decelerator via lines 51, 52, respectively constituting the low- and high-pressure sides of the fluid-circulating path and connected to the differential-valve assembly via conduits 37, 38. The chambers defined by the plates 15, 15' of the rotor and stator sustain a circulation of the fluid resulting in the braking of shaft 10 relative to the stator and the chassis to which it is journaled. The fluid-circulation rotor is not unlike that sustained by conventional fluid-couplings, e.g., of the type shown in pages 272 through 275 of Principles of Automotive Vehicles, supra.

The charging cylinder 2 contains hydraulic fluid which can be pressurized by compressed air from a fluid-operated valve 3 to which the compressed air is supplied by a line 3'. The actuation of valve 3 is accomplished by hydraulic pressure communicated thereto via a conduit 39 from the master-cylinder and differential-valve assembly, generally designated at 4, and is operatively coupled with the hydraulic decelerator so as to adjust the position of the valve body in accordance with the degree of hydraulic braking produced by the decelerator. A fluid line 20 connects a braking-force intensifier 6 to the assembly 4 and permits controlled pressurization of friction disk brakes 17 of the decelerator.

The friction brakes include a pair of disks 17 non-rotatably mounted in the stator 12 by splines 17' with freedom of axial movement with respect to the rotor disk 11, the brake disks 17 lying in respective places perpendicular to the axis of shaft 10. The annular disks 17, moreover, are rigidly connected with respective pistons 16 angularly spaced about the axis of shaft 10 so as to exert axial pressure of the disks 17 and drive them against the brake linings 18 carried by the rotor 11. The metal disks 17, upon engagement with the brake linings 18, reduce the speed of the disks relative to the stator and are most effective at low rotor speeds. The hydraulic cylinders retaining the piston 16 are supplied with hydraulic fluid by a conduit 19, connected to the brake-force intensifier 6. The intensifier is of the type described in Principles of Automotive Vehicles, pages 449 ff., and can have an air cylinder 7 by means of which the compressed-air pressure supplied by line 53 is applied to the hydraulic fluid after passing through a control valve 9 operated by the hydraulic fluid pressure in line 20. The hydraulic cylinder of this intensifier is shown at 8.

The assembly 4 comprises a plunger 24 shiftable within the master-cylinder chamber 28 formed within cylinder housing 22 and communicating via port 54 with the usual brake-fluid reservoir 23. A rod 25 connects the plunger 24 at a pivot 55 with the brake pedal 26 whose depression shifts the plunger 24 to the right until it unilaterally covers port 54 and thereafter applies pressure to the fluid within the master cylinder. A floating piston 27, disposed within the bore defines a seat-forming member provided with a passage 30 communicating between the low-pressure chamber 21 and the high-pressure chamber 28. Line 39 comunicates between the high-pressure chamber 28 and the fluid-operated valve 3, while conduit 20 communicates with the low-pressure chamber 21. A stem-shaped valve body 35 is axially shiftable in the end 36 of the housing 22 remote from the brake pedal 26. The stem 35 is carried by a resilient diaphragm-membrane partitioning the housing 31 into compartments 33 and 34 on opposite sides of the membrane 32 and supplied with fluid via lines 37 and 28, respectively. Since lines 37 and 38 are connected to the low- and high-pressure sides of the hydraulic decelerator, respectively, membrane 32 is operated by the pressure differential developed by the decelerator 1 and thus shifts the body 35 relative to the seat-forming member 27 in accordance with the degree of braking of the shaft 10 by the decelerator 1.

Upon the application of pressure to pedal 26, plunger 24 is shifted to the left (FIG. 1) and pressure is applied to the fluid in chamber 28 and, via passage 30, to the fluid in chamber 21. The hydraulic pressure in line 20 thus rises to bring into play the fluid-operated valve 3 on the one hand and the brake-force intensifier 6 on the other. Valve 3 opens to permit the compressed air supplied by line 3' to pressurize the vessel 2 and drive hydraulic fluid into compartment 13 of the hydraulic decelerator, and in the event of the high rotor speed to brake the rotor with respect to the stator; concurrently, hydraulic fluid in line 19 is pressurized by the intensifier 6 in response of the depression of brake pedal 6 and drives the piston 16 inwardly to bring the brake disks 17 into engagement with the rotor 11. When the rotor speed is high, the pressure differential across lines 37, 38 is proportionally high so that membrane 32 and valve body 34 are displaced to the right to close passage 30 and, upon entrainment of the seat-forming member by the valve body 35 to the right, to expand chamber 21 and relieve the disk-brakes 17. This rightward movement of the floating piston 27 occurs by virtue of its entrainment by valve body 35 and the development of a net axial force via the pressure differential across chambers 33 and 34, suffices to overcome the hydraulic force applied by the plunger 24 and fluid in chamber 28 to the seat-forming member 27.

As the speed of the rotor 11 and its shaft 10 falls as a consequence of the braikng action, the pressure differential across chamber 33, 34 drops and the pressure applied to the brake pedal 26 suffices to shift member 27 to the left, thereby displacing the valve body 35 away from the passage 30. In dependence upon the relative position of the valve body 35 and member 27, a controlled flow of fluid passes via line 20 to the intensifier 6 to effect operation of the friction brakes 17, 18 via line 19 and pistons 16. As the rotation of the rotor decreases to a negligible value, the differential across the membrane 32 disappears entirely so that the passage 30 is commpletely unblocked and all of the braking force is applied to the intensifier 6 and then to the friction brakes 16–18.

It is clear, therefore, that the maximum effectiveness of the friction brakes is observed at very low rotor speed while the maximum hydraulic effectiveness of the decelerator occurs at high rotor speed. For any particular pressure applied to the pedal 26, the sum of the braking effectiveness of the friction-brakes 16–18 and the hydraulic braking of the decelerator is constant. If desired, line 19 can supply the wheel brakes of a vehicle in addition to the rotor brake while the air-brake intentifier 6 can be dispensed with and the hydraulic fluid from line 20 communicates directly to the cylinder, in which piston 16 is displaced. Furthermore, charging cylinder 2 can be replaced by a floating-piston arrangement in which the fluid displacement necessary to activate the hydraulic decelerator is supplied by hydraulic pressure (e.g. from a pump connected in series with a pressure accumulator). Another system can employ a mechanical coupling of angularly movable stator 12 to the valve body 35, as previously mentioned. All these mechanisms may be adapted from the aforementioned application, Ser. No. 402,970.

While the system of FIG. 1 makes use of a rotor in which a pair of annular brake-disks are applied to the rotor disks from opposite sides, the system of FIG. 2 involves a rotor 11a, keyed to a shaft 10a and provided with blades 15a which cooperate with the corresponding blade 15a' of the stator 12a. In this case, the rotor 11a is engageable along its side remote from the vane 15a by an annular brake shoe 17a shiftable by a piston 16a and operated by fluid pressure from a line such as that shown at 19 in FIG. 1. Again a brake lining 18a is provided on the rotor. The system of the present invention provides the integral construction of the differential valve and the master cylinder which greatly facilitates the the mounting of the arrangement in an automotive vehicle and reduce the complications involved in communicating fluid from one point to the other. This unitary arrangement can be employed equally well with the system disclosed in the aforementioned co-pending application.

In FIG. 3 there is shown a hydraulic decelerator 101 whose stator can be resiliently mounted on the chassis of the powered vehicle and whose rotor is keyed to the shaft 101' coupled with the wheels of the towing vehicle. This hydraulic decelerator can be of any conventional type or of the rotor and stator configurations, illustrated in application Ser. No. 402,970, or of the construction shown in FIGS. 1 and 2. A hydraulic decelerator of this character is supplied with hydraulic fluid under pressure from a charging vessel 102 which is pressurized by compressed air from line 123 via a fluid-operated valve 103. The charging cylinder 102 and the fluid-operated valve 103 can be identical in all respects with the corresponding devices of the latter application. The internally-expanding, drum-type brakes of the towing vehicle are represented by the reference numeral 104 and have wheel-brake cylinders 104'. Similarly, the internally-expanding brakes 105 of the trailer differ from those of the towing vehicle in fact that they are expandable by cam action, the cam being operated via levers 105' and wheel-brake cylinders 105''. These brakes are conventional and need not be further described herein except to note that they may be replaced in their entirety or in part by the disk brakes for the rotor, as previously described.

The wheel-brake cylinders 104' are energized with hydraulic fluid via line 140 by the main cylinder 110 of an air-hydraulic cylinder generally designated 106 and provided to act as an intensifier in an air-over-hydraulic brake in an energizing system. Such a system is described on pages 449 and 450 of Principles of Automotive Vehicles, Department of the Army Technical Manual TM 9–8000, (U.S. Government Printing Office, Washington D.C., 1956). The brake intensifier 106 has an air cylinder 109 wherein the compressed air pressure, supplied by line 141, is applied to the hydraulic fluid after passing through a control valve 111 operated by the hydraulic fluid pressure in line 112. Line 112 leads from the low-pressure chamber 113 of the differential valve assembly 108 to the intensifier 106. The housing of the differential-valve assembly 108 is subdivided by an axially displaceable seat-forming member 118, acting as a fluid-operated piston, into a high-pressure chamber 120 and a low-pressure chamber 113. Hydraulic fluid is supplied from a conventional master cylinder 107, operated by brake pedal 142, via a conduit 121, to the high-pressure chamber 120. A passage 119 in the seat-forming member interconnects the high- and low-pressure chambers so that hydraulic fluid can be fed through the passage into line 112. Concurrently, a conduit 122 communicates between the low-pressure chamber 113 and the fluid-operated valve 103 so that a rise in pressure in chamber 113 will lead to opening of valve 103, the pressurizing of cylinder 102 and the energization of decelerator 101.

The differential valve 108 is formed with a capsule-like housing 114 containing the control means of the present invention in the form of a pressure-responsive membrane 115 which subdivides housing 114 into chambers 130 and 131. The membrane carries a double-action valve body generally designated 116 and consisting of a stem 117 co-operating with the seat-forming member 118 and a stem 126 co-operating with a valve seat 127 at opposite axial ends of the body 116. Valve seat 127 surrounds an opening communicating between a conduit 128 serving as a source of fluid under pressure and coupled with a hydraulic pump or air compressor. The stem 126 carries a ball-shaped element 125 engageable with the seat 127 forwardly of a port 129' of conduit 129 opening into a compartment 129'' rearwardly of the valve seat.

Membrane 115 and the double-acting valve body 116 connected therewith are displaceable in response to the degree of deceleration of the shaft 101' by the decelerator 101. Rotation of the rotor of the decelerator with respect to the stator produces a pumping action by means of which hydralic fluid is displaced in a closed path through a heat exchanger (e.g. via lines 132', 133') from an inlet to an outlet respectively. The high- and low-pressure sides of the decelerator are communicated via lines 132, 133 to the chambers 130, 131 of housing 114 on opposite sides of the membrane. Since the pumping action of the decelerator is a direct measure of its braking action, the pressure differential across the membrane moves the valve body 116 in accordance with the braking effectiveness of the decelerator.

When the brake pedal 142 of master cylinder 107 is depressed, hydraulic fluid under pressure passes in a conventional manner through line 121 to chamber 120 of differential valve 108. Passage 119 is open and hydraulic fluid flows therethrough into chamber 113 and thence via line 112 to the brake intensifier 106 wherein compressed air reinforces the braking pressure applied to wheel cylinder 104' of the towing vehicle. Since the membrane 115 and the valve body 116 are in their illustrated positions, compressed air is supplied to the wheel brakes 105. Line 128 can include, for this purpose, a conventional air-brake valve (page 447 of Principles of Automotive Vehicles) to insure that undesirable actuation of the trailer brakes does not occur. Concurrently, the hydraulic fluid of chamber 113 operates valve 103 via line 122 to permit compressed air to flow from line 123 into the charging cylinder 102 and drive hydraulic fluid into the decelerator 101 which is thus brought into play to reduce the speed of drive shaft 101'. If it is assumed that the vehicle is traveling at elevated speed (e.g. during downhill movement), shaft 101' will be rotating rapidly and the braking effectiveness of the decelerator 101 will be high. The hydraulic pressure produced by the decelerator is communicated to housing 114 via lines 132, 133 and the resulting pressures differential displaces membrane 115 and the valve body 116 to the left, as seen in the drawing. Valve passage 119 is closed while the ball-shaped element engages seat 127. With closing of the passage 119, the seat-forming member can be shifted to the left by stem 117 to partly relieve the wheel brakes 104 when the decelerator 101 is at its maximum effectiveness.

The valve member 118 is held against stem 117 by virtue of the net force in the direction thereof resulting from the pressures in chambers 120 and 113. As the shaft rotation is slowed, the pressure differential generated by decelerator 101 is reduced and the valve member 116 tends to move with the membrane 115 to the right and open the passage 119. The pressure in chamber 120, however, maintains member 118 against stem 117 until the pressure in chamber 113 is again sufficient to resist further displacement of the member. During this movement of the piston-like member, the chamber 113 is reduced in volume, while the intensifier 106 is supplied with increased pressure thereby effecting increased braking 104. Further depression of pedal 142 can augment the wheel-braking action in the usual manner. As the valve body 106 shifts to the right in response to a slowing of shaft 101', valve element 125 is drawn away from seat 127 and permits fluid to flow from line 128 via line 129 into the cylinders 105" of the trailer brakes. When shaft rotation is reduced to a negligible value, the mechanical braking is at a maximum. Since the stem 117 co-operates with the seat-forming member 118 as described, it constitutes an abutment-type valve wherein the valve element (stem 117) is forced into contact with the seat from the etxerior of the valve member. On the other hand, valve element 125 is drawn into engagement with its valve seat from behind the latter. A spring 124 is provided to urge the valve element 125 into engagement with seat 127. A return flow of fluid from cylinder 105" can thus displace the pusher-type valve element 125 against the force of spring 124 to re-establish a disengaged condition of the brake.

The invention described and illustrated is believed to admit of many modifications within the ability of persons skilled in the art, all such modifications being considered within the spirit and scope of the appended claims.

We claim:

1. A hydraulic decelerator system for an automotive vehicle provided with a shaft coupled with wheels of said vehicle, said system comprising: a hydraulic decelerator operatively connected with said shaft and having a rotating member mounted thereon and a relatively stationary member connected with the vehicle chassis for reducing the rotary speed of said shaft upon the application of hydraulic fluid under pressure to said decelerator; fluid-responsive friction-brake means in said decelerator energizable with fluid under pressure for frictionally interconnecting said members and bringing said shaft to a standstill; and brake-operating means on said vehicle for supplying fluid under pressure to said friction-brake means and said hydraulic decelerator, thereby actuating same, said brake-operating means including differential-valve means provided with a passage, a valve body co-operating with said passage for selectively blocking and unblocking same, master-cylinder means for applying fluid under pressure to said differential-valve means, decelerator-energizing means responsive to the pressure of fluid supplied by said master-cylinder means and flowing through said passage for applying hydraulic fluid under pressure by said decelerator, control means responsive to the degree of hydraulic braking by said decelerator of said shaft for the selectively displacing of said valve body relatively to said passage, and conduit means connecting said fluid-responsive friction-brake means with said differential-valve means for energiaztion of said friction-brake means in inverse relationship to the degree of hydraulic braking of said shaft by said decelerator, thereby maintaining the total braking force applied to said vehicle by both said hydraulic decelerator and said friction-brake means substantially constant for all shaft speeds at a given pressure within said master-cylinder means.

2. A system as defined in claim 1 wherein said differential valve means and said master-cylinder means are formed within a common housing, said housing being provided with an elongated chamber, said master-cylinder means including a plunger longitudinally shiftable within said chamber at one end thereof upon displacement by vehicle operator to brake the vehicle, said differential-valve means including a seat-forming member disposed within said chamber and longitudinally spaced from said plunger for subdividing said chamber into a high-pressure compartment containing fluid compressible by said plunger and a low-pressure compartment remote from said plunger, said passage being formed in said seat-forming member and interconnecting said compartments, said conduit means communicating between said low-pressure compartment and said friction-brake means, said decelerator-energizing means communicating with said high-pressure compartment.

3. A system as defined in claim 2 wherein said valve body etxends into said chamber through the other end thereof, said control means including a pressure-responsive element carrying said valve body, said hydraulic decelerator having a fluid input and output and developing a pressure differential proportioned to the degree of hydraulic braking of said shaft by said decelerator, and means for communicating the fluid pressure at said input and output of said hydraulic decelerator to opposite sides of said pressure-responsive element for displacing same in accordance with the pressure differential developed by said hydraulic decelerator.

4. A system as defined in claim 3 wherein said control means further includes casing means secured to said housing and enclosing said pressure-responsive element for applying the fluid pressure at said input and output to said element, said element being comprised by a differential membrane spanning said casing.

5. A system as defined in claim 2 wherein said fluid-responsive friction-brake means includes a braking-force intensifier interposed between said low-pressure compartment and said hydraulic decelerator in said conduit means.

6. A system as defined in claim 2 wherein said hydraulic decelerator includes a disk-shaped rotor keyed to said shaft and extending generally transversely thereto, and a stator surrounding said rotor, said friction-brake means including at least one brake shoe lying in a plane perpendicular to said shaft and juxtaposed with said rotor, and piston means displaceable by fluid under pressure from said conduit means for shifting said brake shoe axially into engagement with said rotor.

7. A system as defined in claim 6 wherein said brake shoe is an annular disk splined to said stator for axial displacement relatively thereto but is nonrotatable relatively thereto.

8. A system as defined in claim 7 wherein said rotor is provided with at least one annular brake lining engageable by said disk.

9. A system as defined in claim 1 wherein said vehicle is linked with and entrains a trailer-type vehicle having wheel-brake means, said system comprising further valve means operable by said control means for supplying fluid under pressure to the wheel-brake means of said trailer-type vehicle.

10. In a vehicle-braking system for an automotive vehicle having a shaft coupled with wheels of the vehicle and fluid-responsive friction-brake means for bringing said vehicle to a halt, in combination, a hydraulic decelerator coupled to said shaft and operable upon an increase of hydraulic pressure applied to said decelerator for reducing the speed of the shaft; fluid-responsive brake-actuating means coupled with said friction-brake means for energizing same; and control means operatively interconnecting said hydraulic decelerator and said brake-actuating means for increasing the hydraulic pressure applied to said decelerator upon operation of said brake-actuating means, said brake-operating means including differential-valve means provided with a passage, a valve body co-operating with said passage for selectively blocking and unblocking same, master-cylinder means for supplying fluid under pressure to said differential valve means, and decelerator-energizing means responsive to the pressure of fluid supplied by said master-cylinder means and flowing through said passage for applying hydraulic fluid under pressure to said decelerator means, said differential-valve means and said master cylinder being provided within a common housing formed with an elongated chamber, said master-cylinder means including a plunger longitudinally shiftable within said chamber at one end thereof upon displacement by vehicle operator to brake the vehicle, said differential-valve means including a seat-forming member disposed within said chamber and longitudinally spaced from said plunger for subdividing said chamber into a high-pressure compartment containing fluid compressible by said plunger and a low-pressure compartment remote from said plunger, said passage being formed in said seat-forming member and interconnecting said compartments, said conduit means communicating between said low-pressure compartment and said friction-brake means, said decelerator-energizing means communicating with said high-pressure compartment.

11. A braking system for a conveyance including a powered vehicle having a drive shaft coupled with wheels of said powered vehicle and a trailer-type vehicle linked with said powered vehicle for towing thereby and having wheel-brake means, said braking system comprising:
 a hydraulic decelerator operatively connected to said shaft for reducing the rotary speed thereof upon the application of hydraulic fluid under pressure to said decelerator;
 fluid-responsive wheel-brake means on said trailer-type vehicle for braking the wheels thereof upon the supply of fluid under pressure to said wheel-brake means;
 brake-operating means on said powered vehicle including differential-valve means provided with a passage, a valve body co-operating with said passage for selectively blocking and unblocking same, master-cylinder means for supplying fluid under pressure to said differential-valve means, and decelerator-energizing means responsive to the pressure of fluid supplied by said master-cylinder means and flowing through said passage for applying hydraulic fluid under pressure to said decelerator;
 control means responsive to the degree of braking by said decelerator of said shaft for selectively displacing said valve body relatively to said passage; and
 further valve means operable by said control means for supplying fluid under pressure to the wheel-brake means of said trailer-type vehicle upon a decline in the degree of braking of said shaft by said decelerator to permit said wheel-brake means to brake the wheels of said trailer-type vehicle upon reduction of the rotary speed of said shaft.

12. A braking system as defined in claim 11, further comprising additional brake means responsive to said pressure of fluid supplied by said master-cylinder means to said differential-valve means and flowing through said passage for bringing said powered vehicle to a standstill upon a decline in the degree of braking of said shaft by said decelerator indicative of a reduction in the rotary speed of said shaft.

13. A braking system as defined in claim 12 wherein said additional brake means includes fluid-responsive wheel-brake means on said powered vehicle for braking the wheels thereof, said differential-valve means including a housing and a seat-forming member displaceable in said housing under the action of fluid pressure and provided with said passage while co-operating with said valve body, said member subdividing said housing into a high-pressure chamber and a low-pressure chamber interconnected by said passage, said brake-control means communicating with said high pressure chamber, said decelerator-energizing means and said additional brake means communicating with said low-pressure chamber.

14. A brake system as defined in claim 13 wherein said further valve means is mechanically connected with said valve body for operation thereby.

15. A braking system as defined in claim 14 wherein said control means includes an element displaceable in response to a fluid-pressure differential generated by said decelerator during the braking of said shaft, said valve body being fixed to said element for blocking said passage during a high degree of braking of said shaft by said decelerator and for unblocking said passage upon reduction in the degree of braking of said shaft by said decelerator to maintain the collective braking of said power vehicle by said decelerator and said additional brake means substantially constant upon operation of said master-cylinder means, said further valve means including a valve seat provided with an opening communicating between a source of fluid under pressure and said fluid-responsive wheel-brake means of said trailer-type vehicle, and a further valve body secured to said element and displaceable therewith while co-operating with said valve seat for selectively blocking and unblocking said opening substantially in step with the blocking and unblocking of said passage by the first-mentioned valve body.

16. A braking system as defined in claim 15 wherein said element is a membrane, said decelerator comprising a stator and a rotor co-operating therewith for effecting displacement of hydraulic fluid along a substantially closed path having a high-pressure side and a low-pressure side, said system further comprising conduit means respectively applying the pressure of said high- and low-pressure sides of said path to opposite sides of said membrane.

17. A braking system as defined in claim 16 wherein said source supplies compressed air to said further valve means whereas said master-cylinder means supplies a hydraulic fluid to said differential-valve means.

References Cited by the Examiner
UNITED STATES PATENTS 2,177,511   10/1939   Aikman _____ 188—86 X
2,351,180   6/1944    Ash _____ 188—86 X

FOREIGN PATENTS 678,102   7/1939   Germany.

MILTON BUCHLER, *Primary Examiner.*
G. E. A. HALVOSA, *Assistant Examiner.*